C. W. LEVALLEY.
SUPPORT FOR BELT SHIFTERS.
APPLICATION FILED DEC. 7, 1905. RENEWED JAN. 14, 1909.
942,837.
Patented Dec. 7, 1909.
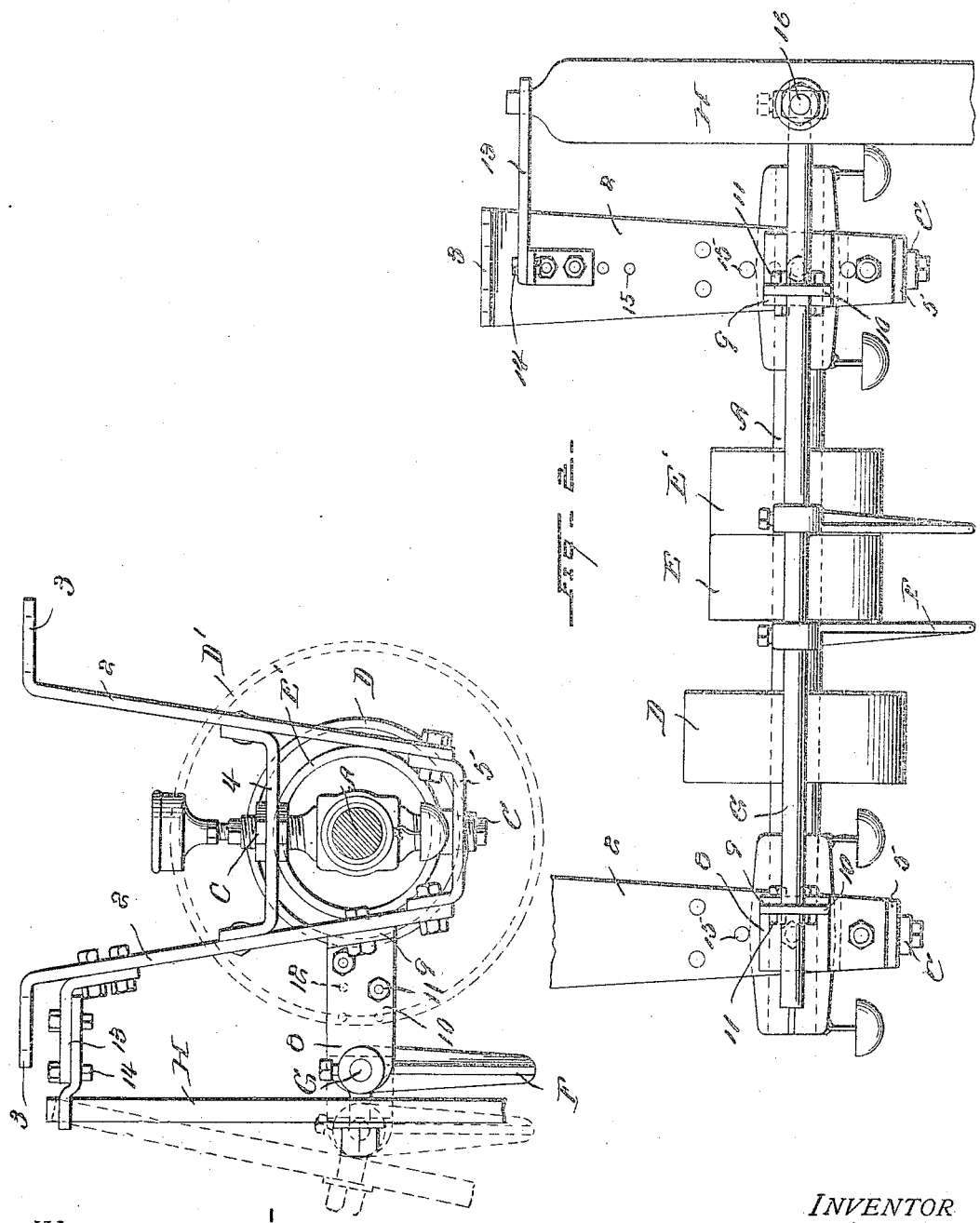
WITNESSES:
E. B. Ratcliffe
Geo. B. Pitts
INVENTOR
Christopher W. Levalley
BY J. S. Barker
his Attorney

UNITED STATES PATENT OFFICE.

CHRISTOPHER W. LEVALLEY, OF MILWAUKEE, WISCONSIN.

SUPPORT FOR BELT-SHIFTERS.

942,837. Specification of Letters Patent. Patented Dec. 7, 1909.

Application filed December 7, 1905, Serial No. 290,780. Renewed January 14, 1909. Serial No. 472,297.

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Supports for Belt-Shifters, of which the following is a specification.

My invention relates to supports for belt shifters, and has for its object to produce a support of this kind that is adjustable and may be secured to and supported by a shaft hanger.

In the accompanying drawings, wherein I have illustrated my improvements, Figure 1 is an end view of my improvements, the supported shaft being shown in section and the bearings thereof and various pulleys thereon in elevation. Fig. 2 is a side view of the parts represented in Fig. 1.

The shaft hanger illustrated has been devised with special reference to having the several parts thereof separable from each other and so shaped that they may be easily packed in a small space, the parts readily nesting one with another; and also with reference to forming the several parts from plate steel, they being so constructed and assembled as to impart to the completed hanger the requisite strength without the necessity of resorting to expensive and special constructions of steel or iron but the present invention is not to be limited in its useful applications to a shaft hanger of the particular kind herein illustrated serving as a support for the belt shifter.

Each hanger is constructed of two independent, similar and integral side members or brace pieces 2, 2, between which the shaft A is arranged. The side members are provided with feet 3 by means of which the hanger is attached to a ceiling or other support. The shaft A and its bearings are arranged between the lower portions of the side members of the hanger and are connected thereto by means of the cross pieces or members 4 and 5 with which the adjusting devices C, C, of the shaft have engagement.

D indicates a pulley upon the shaft A around which may pass a belt from the motor, and E, E' indicate the fast and loose pulleys with which may be made to engage the driven belt connecting the line shaft A with some machine.

A belt shifter comprising a fork F and a sliding shaft G, upon which the fork is mounted, is arranged in position to engage with and operate the belt upon the pulleys E, E'. The shaft G is mounted, so as to slide longitudinally, in brackets 8 secured to and projecting outward from the shaft hangers. Each of these brackets is preferably formed of two parts adjustable one upon the other so that the portion of the bracket that constitutes the bearing for the shaft G may be thrown outward or inward relative to the line shaft, it being evident that if a pulley D of large size, as indicated in dotted lines at D' in Fig. 1, be employed instead of one of the size shown in full lines, the belt shifting device should set out farther from the shaft than represented in the drawings.

9 indicates an angular plate securely bolted to one of the depending side braces 2 of the shaft hanger and 10 is another plate, in which the shaft G has bearing, secured to the outward extending portion of the bracket plate 9 by the bolts 11. The plates 9 and 10 are provided respectively with a series of bolt apertures 12, and by bringing one or another set of these into alinement, and securing the plates 9 and 10 together by the bolts 11, the bearing plate 10 may be set out or in relative to the line shaft and the belt shifter correspondingly adjusted. The upper end of the shifting lever H is mounted in a bracket 13 secured to the shaft hanger near its upper end. This bracket is preferably made of two parts, secured together by the bolts 14, and adjustable with reference to each other in the same way as are the parts of the bracket 8. The side brace member 2, to which the supports for the belt shifter are secured, may be provided with a series of vertically disposed apertures 15, permitting such vertical adjustment of the brackets or supports 8 and 13 as may be desirable.

It is evident that the belt shifting device can be arranged on either side of the hanger, and the shifter lever H may be arranged at the opposite side of the pulleys E, E' from that shown by simply changing the support 13 therefor to the left hand shaft hanger, and properly adjusting the connection 16 between the shaft G and shifting lever H along the shaft.

It will be observed by reference to Fig. 2 that the support for the upper end of the shifter lever not only projects outward from the shaft hanger, but also to one side thereof so that its bearing shall be disposed so far to one side of the bracket 8 as to prevent the latter from interfering with the free movements of the shifting lever.

Having described my invention, what I claim and desire to secure by Letters Patent is:

1. The combination with a belt shifter comprising a longitudinally movable shaft and a shifting lever, of a shaft hanger, an adjustable bearing for the shaft of the belt shifter secured to the lower portion of the shaft hanger, and a bracket having a bearing for the upper end of the shifting lever secured to the upper portion of the shaft hanger, substantially as set forth.

2. The combination with a shaft hanger and a belt shifter comprising a longitudinally movable shaft and a shifting lever therefor, of a bearing for the shaft of the belt shifter secured to the lower end of the shaft hanger and adjustable to carry the belt shifting shaft toward or from the shaft hanger, and a bracket having a bearing for the upper end of the shifting lever, said bracket being also adjustable, substantially as set forth.

3. The combination of a belt shifter comprising a longitudinally movable shaft, bearings adjustable both vertically and horizontally, a belt shifter lever, a bearing for the said lever adjustable vertically and horizontally relatively to said bearings for the belt shifter shaft, and means for securing said bearings in their adjusted positions.

4. The combination with a shaft hanger, of a belt shifter comprising a longitudinally movable shaft, a bearing for the said shaft adjustable vertically, and toward and from the said shaft hanger, a belt shifter lever, a bearing for the said lever secured to said shaft hanger, means for independently adjusting said bearing both vertically and horizontally relatively to said belt shifter shaft, and means for securing the belt shifter and lever bearings in their adjusted positions.

CHRISTOPHER W. LEVALLEY.

Witnesses:
WILLIAM W. COCHRANE,
JOSEPH LOCH.